(12) United States Patent
Sato et al.

(10) Patent No.: US 7,581,196 B2
(45) Date of Patent: Aug. 25, 2009

(54) RESERVATION REGISTRATION APPARATUS METHOD OF RESERVATION REGISTRATION AND PROGRAM STORAGE MEDIUM

(75) Inventors: Katsushi Sato, Kanagawa (JP); Kumiko Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 427 days.

(21) Appl. No.: 09/769,968

(22) Filed: Jan. 26, 2001

(65) Prior Publication Data

US 2001/0018661 A1    Aug. 30, 2001

(30) Foreign Application Priority Data

Jan. 28, 2000    (JP) .............................. 2000-024801

(51) Int. Cl.
G06F 3/048 (2006.01)
G06F 3/00 (2006.01)
(52) U.S. Cl. ........................... 715/963; 715/810; 705/5; 705/6
(58) Field of Classification Search ................ 345/764, 345/747, 723, 810, 721, 963; 705/5, 6; 712/217
See application file for complete search history.

(56) References Cited

U.S. PATENT DOCUMENTS

| | | | | |
|---|---|---|---|---|
| 5,410,369 A | * | 4/1995 | Nakajima | .................... 348/730 |
| 5,601,436 A | * | 2/1997 | Sudman et al. | ......... 434/307 R |
| 5,936,625 A | * | 8/1999 | Kahl et al. | ................... 715/775 |
| 6,025,837 A | * | 2/2000 | Matthews et al. | ........... 345/721 |
| 6,085,166 A | * | 7/2000 | Beckhardt et al. | ............... 705/9 |
| 6,313,852 B1 | * | 11/2001 | Ishizaki et al. | ............... 715/751 |
| 6,351,765 B1 | * | 2/2002 | Pietropaolo et al. | ......... 709/218 |
| 6,353,794 B1 | * | 3/2002 | Davis et al. | ................. 701/201 |
| 6,380,953 B1 | * | 4/2002 | Mizuno | ...................... 715/764 |
| 6,392,669 B1 | * | 5/2002 | Matoba et al. | ............... 345/751 |
| 6,414,686 B1 | * | 7/2002 | Protheroe et al. | ........... 345/474 |
| 6,481,010 B2 | * | 11/2002 | Nishikawa et al. | ............. 725/44 |
| 6,522,342 B1 | * | 2/2003 | Gagnon et al. | .............. 345/716 |
| 6,538,665 B2 | * | 3/2003 | Crow et al. | .................. 345/723 |

* cited by examiner

*Primary Examiner*—Dennis Bonshock
(74) *Attorney, Agent, or Firm*—Oblon, Spivak, McClelland, Maier & Neustadt, P.C.

(57) ABSTRACT

A reservation registration apparatus, a method of reservation registration and a program storage medium allow reservation registration to be performed by easy operation. A starting time and an ending time can be set and changed by easy operation by displaying on a display screen reservation subject icons representing reservation subjects and a time base display area for performing reservation registration, and when the reservation subject icons are moved onto the time base display area, displaying a reservation time frame display division representing a starting time and an ending time of the reservation subjects according to positions to which they are moved, and changing a starting time or an ending time according to movement of the entire reservation time frame display division or movement of the first end or the second end of the reservation time frame display division.

25 Claims, 10 Drawing Sheets

RESERVATION REGISTRATION APPARATUS METHOD OF RESERVATION REGISTRATION AND PROGRAM STORAGE MEDIUM

BACKGROUND OF THE INVENTION

1. Field of the Invention

The present invention relates to a reservation registration apparatus, a method of reservation registration and a program storage medium, and more particularly, is suitably applied to, for instance, a reservation registration apparatus for causing an arbitrary reservation subject to be manipulated at a specified starting time.

2. Description of the Related Art

Conventionally, a method of setting a reservation called wizard is widely used in a method of setting a reservation such as a picture recording reservation.

In reality, if a method of setting a reservation called wizard is used, screens for setting a subject channel of a picture recording reservation and a starting time and an ending time and so on thereof are sequentially displayed. And if a setting process by a user is completed on the setting screens, the user recognizes the reservation settings with a predetermined setting results display screen displayed.

Thus, the wizard allows a user to easily conduct a reservation setting process just by inputting settings such as a channel, starting time and ending time of a program desired to be reserved for picture recording according to setting screens that are sequentially displayed.

In such a configuration, however, there is a problem that since setting screens are sequentially displayed, it is difficult for a user to recognize when a reservation setting process will be completed.

Moreover, there were problems that, as a setting screen for inputting settings and a setting results display screen for displaying the results of input settings are different, a user cannot grasp the results of settings until the settings are completely inputted, and also its operability is bad since once the input is completed, it is difficult to change the settings.

Furthermore, there is a problems that, in the case of performing reservation setting by using such a wizard on an audio apparatus such as a component stereo having a plurality of reservation subjects including a Compact Disk (CD), a Mini Disk (MD)(Trademark) and an FM radio, for instance, configuration of a wizard becomes complicated due to the plurality of reservation subjects and thus operability is impaired.

SUMMARY OF THE INVENTION

In view of the foregoing, an object of the invention is to provide a reservation registration apparatus, a method of reservation registration and a program storage medium that allow reservation registration to be performed by easy operation.

The foregoing object and other objects of the invention have been achieved by the provision of a reservation registration apparatus which allows reservation registration to be performed by easy operation, even if there are a plurality of reservation subjects, by displaying on the display screen a reservation subject icon representing a reservation subject and a time base display area for performing a reservation registration, and when the reservation subject icon is moved onto the time base display area, displaying a reservation time display division in a position on the time base display area onto which the reservation subject icon is moved and performing reservation registration taking a time according to a display position of the reservation time display division on the time base display area as a starting time of the process of the reservation subject.

Also, it allows a starting time and an ending time to be changed by easy operation, by displaying a reservation time frame display division of which first end is a position corresponding to a starting time on a time base display area and second end is a position corresponding to an arbitrary ending time after the starting time on the time base display area, performing reservation registration of the starting time and the ending time based on the positions of the first end and the second end, and when the center of the reservation time frame display division is dragged, changing the starting time and the ending time according to the position of the reservation time frame display division after it is dragged, and also when the first end or the second end of the reservation time frame display division is dragged, changing the starting time and the ending time according to the position of the first end or the second end after it is dragged.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Overall Configuration of Personal Computer

Figure 1:
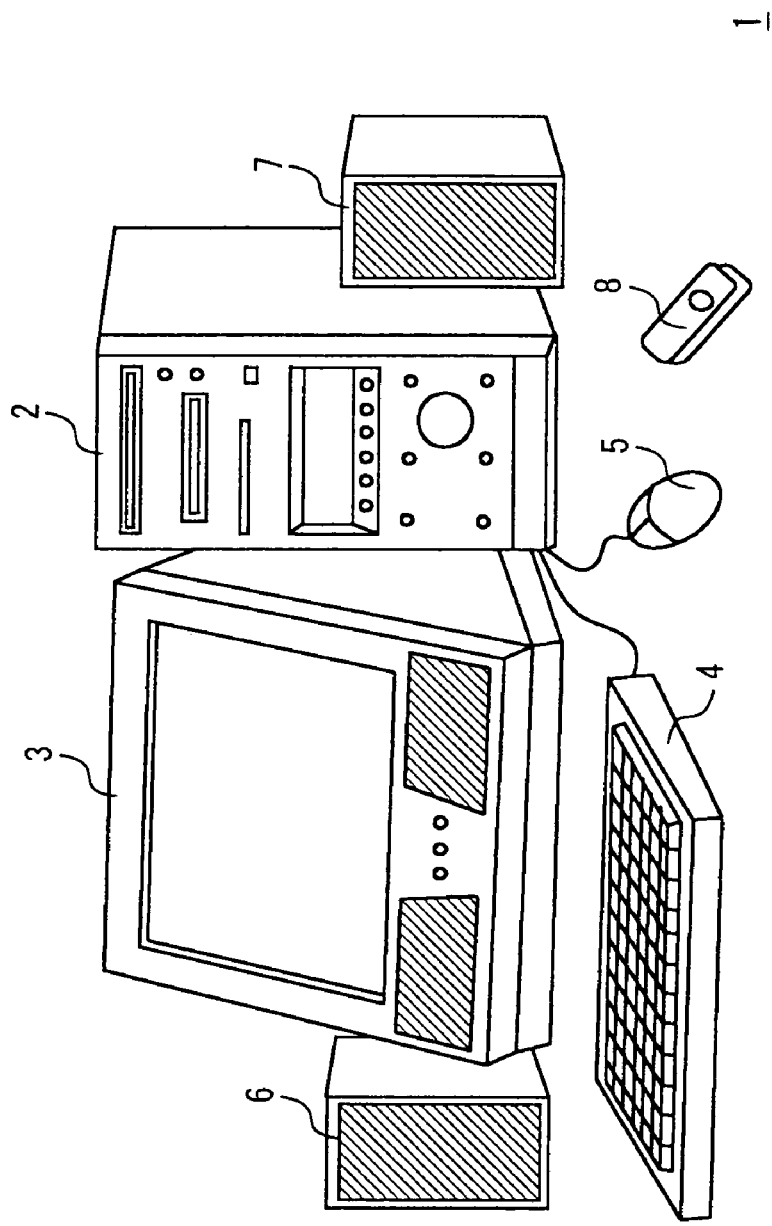
FIG. 1 is a schematic diagram showing overall configuration of a personal computer of the present invention.

In FIG. 1, reference numeral 1 shows a desktop type personal computer (hereinafter, referred to as a personal computer) to which the present invention is applied as a whole, wherein a display 3, keyboard 4, mouse 5, speakers 6 and 7 are connected to a main unit 2 performing various kinds of information processing. In addition, the personal computer 1 has a remote commander (remote control) 8 for remotely controlling processing on the main unit 2 via infrared rays.

(1-1) Configuration of Main Unit

Figure 2:
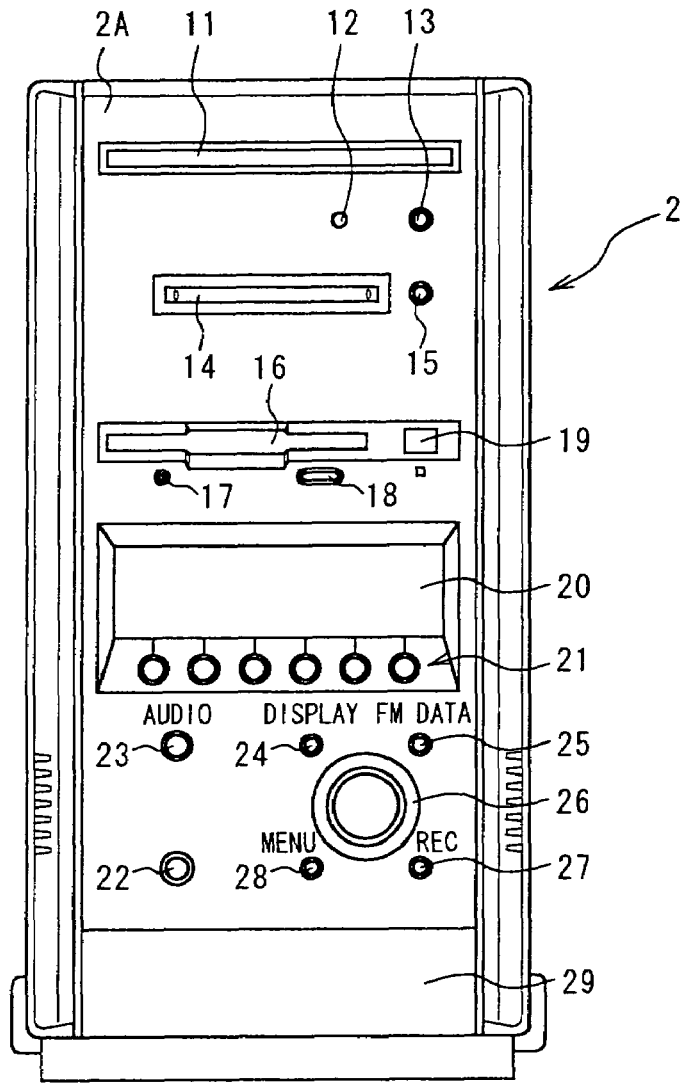
FIG. 2 is a schematic diagram showing configuration of a front panel of a main unit.

As shown in FIG. 2, the main unit 2 has, at the top end of a front panel 2A, a Digital Versatile Disc Read-Only Memory (DVD-ROM) drive 11, an access lamp 12 for showing a state of access to a disk placed on the DVD-ROM drive 11 and an eject button 13 for ejecting a disk placed on the DVD-ROM drive 11 installed, and also below the DVD-ROM drive 11, a Mini Disk (MD) (trademark) drive 14 for instance that is a magneto-optic disk for music and its eject button 15 installed.

Moreover, it has, below MD drive 14, a floppy disk drive (FDD) 16, access lamp 17 and eject button 18 of the FDD 16 and infrared rays receptive division 19 for receiving infrared rays irradiated from remote control 8 (FIG. 1) installed.

Furthermore, it has, below the FDD 16, a Liquid Crystal Display (LCD) panel 20 for displaying an operating state of the personal computer 1 and a plurality of multifunction buttons 21 used for, during operation of the personal computer 1 in audio mode (mentioned later), operations of selecting a sound source, selecting a tune of an MD, a CD and so on, and selecting a station of an FM broadcast installed.

It has, below the multifunction buttons 21, a PC power button 22 for starting up the entire personal computer 1 to use the personal computer 1 in PC mode (mentioned later), an audio power button 23 for starting up only an audio function of the personal computer 1 to use the personal computer 1 in audio mode (mentioned later), a display button 24 for switching a display mode of the LCD panel 20 when the personal computer 1 is operating in audio mode, an FM data button 25 for displaying/non-displaying an FM character broadcast in audio mode, a volume dial 26 for adjusting playback volume from the speakers 6 and 7 (FIG. 1), a recording button 27 for recording sound of an FM broadcast and a music CD on an MD in audio mode, and a menu button 28 for displaying a menu screen on the LCD panel 20 in audio mode installed.

Figure 3:
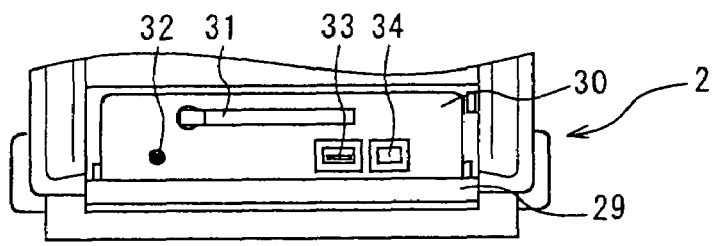
FIG. 3 is a schematic diagram showing configuration of a connector storage division.

Moreover, it has, at the bottom end of the front panel 2A, a door division 29 installed in a reclosable manner, and on the backside of the door division 29, as shown in FIG. 3, a connector storage division 30 having a Personal Computer (PC) card slot 31, a headphone connector 32, a Universal Serial Bus (USB) connector 33 and an Institute of Electrical and Electronics Engineer (IEEE) 1394 connector 34 installed.

Figure 4:
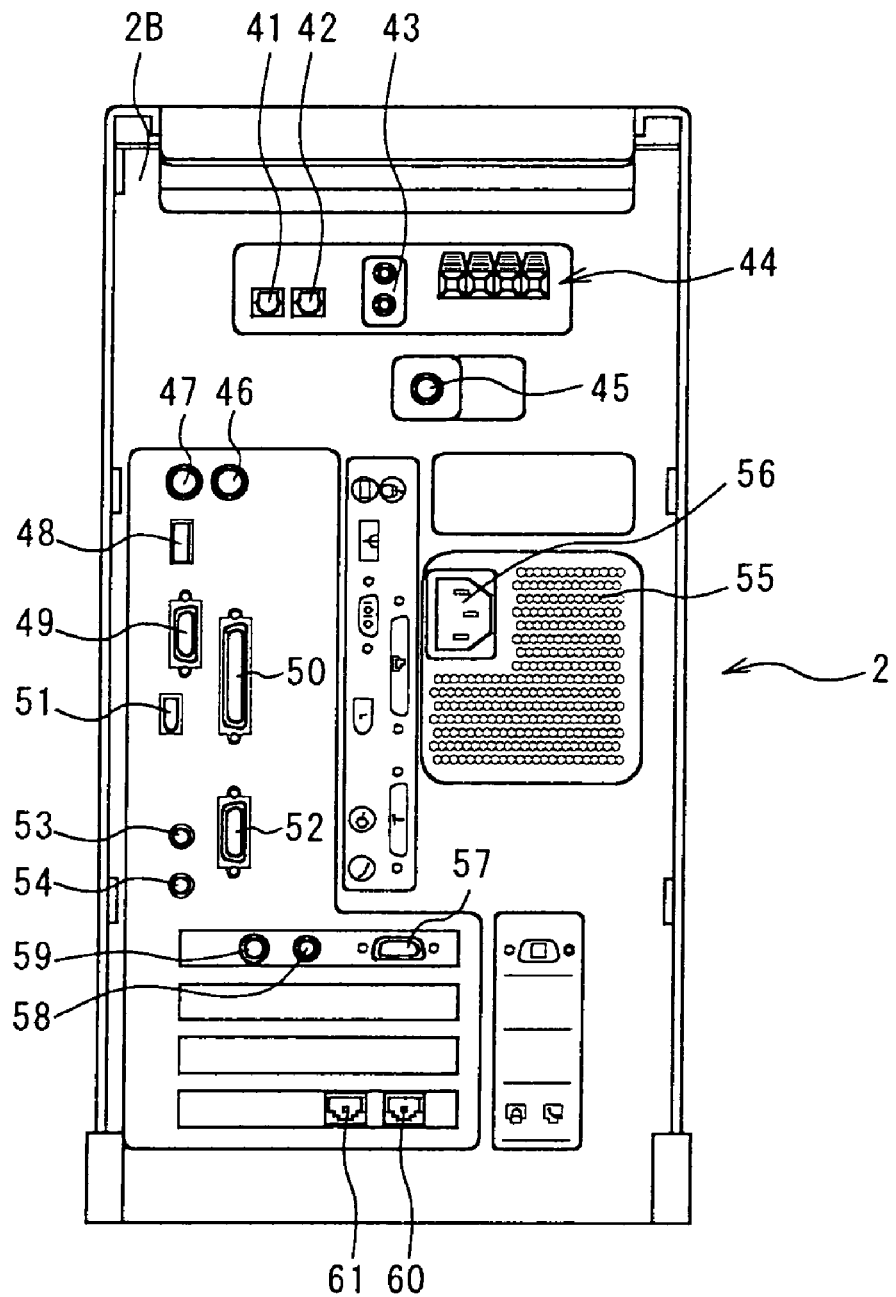
FIG. 4 is a schematic diagram showing configuration of a back panel.

On the other hand, it has, as shown in FIG. 4, at the top end of the back panel 2B of the main unit 2, an optical output connector 41 for outputting sound generated by the personal computer 1 as optical digital signals to other audio apparatuses, an optical input connector 42 for inputting optical digital signals supplied from other audio apparatuses, a line output connector 43 for outputting sound generated by the personal computer 1 as analog sound signals to other audio apparatuses, a speaker connector 44 for outputting sound generated by the personal computer 1 to the speaker 6 (FIG. 1), and an FM antenna connector 45 for connecting an FM antenna (not illustrated) installed.

It also has, at the central left end of the back panel 2B, a mouse connector 46, keyboard connector 47, USB connector 48, serial connector 49, printer connector 50, IEEE 1394 connector 51, game connector 52, line input connector 53 for inputting analog sound signals supplied from audio apparatuses, and microphone connector 54 installed, and at the central right end of the back panel 2B, an air vent for heat radiation 55 and Alternative Current (AC) power input plug 56 installed.

Furthermore, it has, at the bottom end of the back panel 2B, a monitor connector 57, video output connector 58, S video output connector 59, telephone jack 60 and telephone line jack 61 installed.

(1-2) Circuit Configuration of Main Unit

Figure 5:
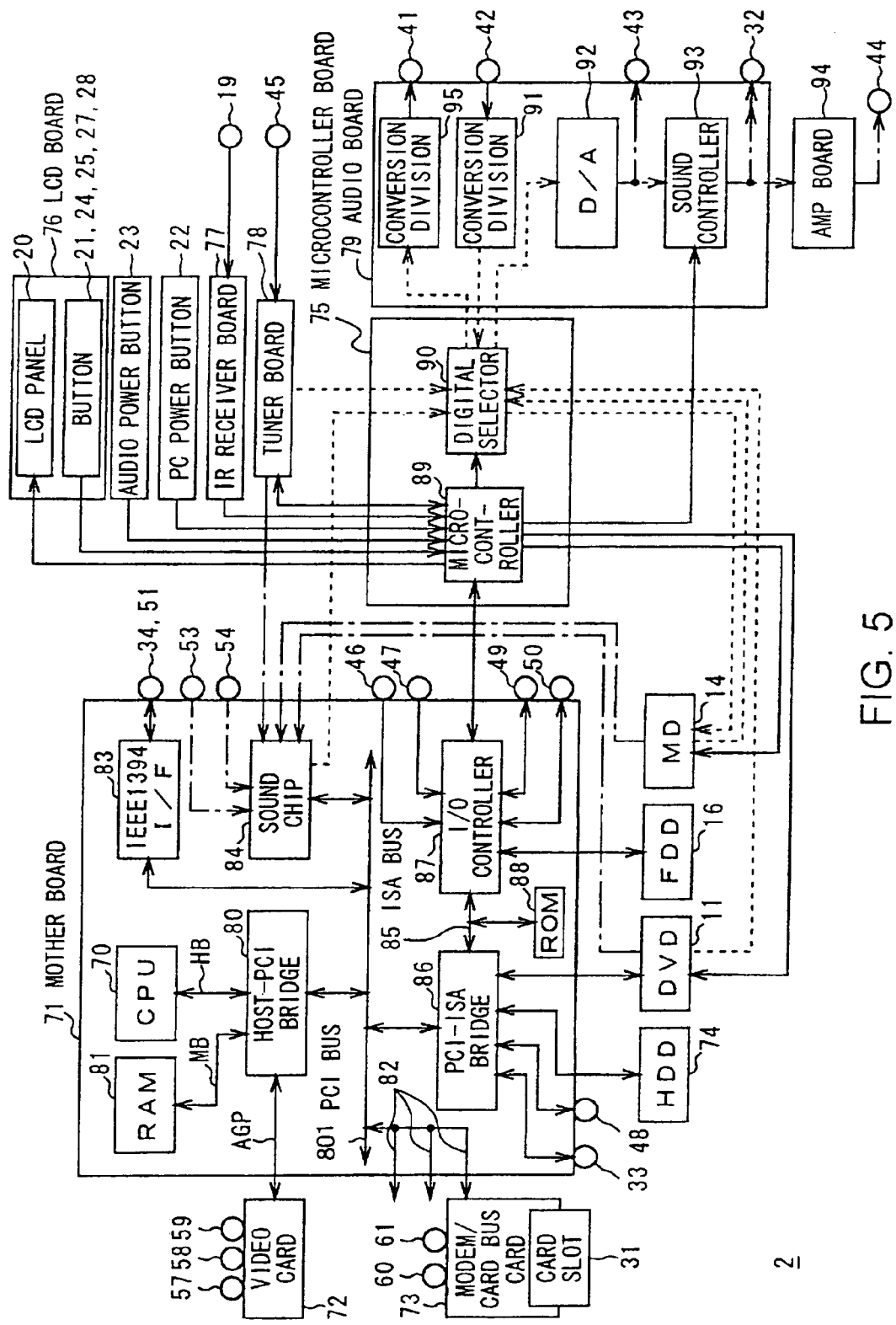
FIG. 5 is a block diagram showing circuit configuration of a personal computer.

Next, circuit configuration of the main unit 2 is described by using FIG. 5. Here, in FIG. 5, a control signal line and a data signal line are indicated in a solid line, an analog sound signal line in a dot dash line, and a digital sound signal line in a dotted line.

On the main unit 2 of the personal computer 1, a mother board 71 mounting a Central Processing Unit (CPU) 70 has connections established with a video card 72, modem/card bus card 73, hard disk drive (HDD) 74, DVD-ROM drive 11, FDD 16, MD drive 14 and a microcontroller board 75. Also, the microcontroller board 75 has connections established with an LCD board 76, Infra-Red (infrared rays) (IR) receiver board 77, FM tuner board 78 and audio board 79.

On the mother board 71, the CPU 70 centrally controlling various functions of the personal computer 1 in PC mode mentioned later has a connection established with a host-PCI bridge 80 via the host bus HB. This host-PCI bridge 80 has a connection established with a Random Access Memory (RAM) 81 via a memory bus MB, and the CPU 70 executes processes according to varied programs and application software loaded on the RAM 81 so that various functions can be implemented.

Moreover, the host-PCI bridge 80 has a connection established with the video card 72 via an Accelerated Graphics Port (AGP), and can thereby transfer image data at high speed between the host-PCI bridge 80 and the video card 72.

The video card 72 can display a plurality of window screens on the display 3 (FIG. 1) by storing image data based on various application software supplied at appropriate times in a self-contained Video Random Access Memory (VRAM) and reading it appropriately to output the read image data to the display 3 via the monitor connector 57. The video card 72 can also convert the image data read from the VRAM into video signals to supply it to image apparatuses such as a television monitor and a VTR via video output connector 58 and the S video output connector 59.

In addition, the host-PCI bridge 80 has a connection established with the PCI bus 801, which has connections established with three PCI slots 82, IEEE 1394 interface 83 and sound chip 84.

One of the three PCI slots 82 has a connection established with the modem/card bus card 73. The modem/card bus card 73 has the PC card slot 31 installed, and data can be sent and received between a PC card inserted in the PC card slot 31 and PCI bus 801. Also, the modem/card bus card 73 has the telephone line jack 61 and telephone jack 60 installed so that a connection can be made to an Internet service provider via a public switched telephone network (not illustrated) from the telephone line jack 61 and then to the Internet via the Internet service provider and also voice communication can be made by connecting a telephone (not illustrated) to the telephone jack 60 and using the telephone when the personal computer 1 is not using the telephone line.

The IEEE 1394 interface 83 has direct connections established with the IEEE 1394 connectors 34 and 51, and can be connected to external devices such as another computer apparatus and a digital video camera via the IEEE 1394 connectors 34 and 51.

Here, the host-PCI bridge 80 controls exchange of various data conducted between the CPU 70 and video card 72, IEEE 1394 interface 83 and modem/card bus card 73, and performs memory control of the RAM 81 connected via memory bus MB.

PCI bus 801 has a connection established with an Industrial Standard Architecture (ISA) bus 85 via a PCI-ISA bridge 86, and the PCI-ISA bridge 86 has connections established with the USB terminals 33 and 48, HDD 74 and DVD-ROM drive 11.

Here, PCI-ISA bridge 86 comprises an Integrated Drive Electronics (IDE) interface, a configuration register, a Real-Time Clock (RTC) circuit, a USB interface and so on, and controls the HDD 74 and DVD-ROM drive 11 via the IDE interface based on a system clock given from a clock generator (not illustrated).

The HDD 74 hard disk stores an operating system (OS) such as Windows 98 (Microsoft Corp., a trademark), an electronic mail program, a power-saving program, a screen saver program, an audio control program, a timer program and various application software other than these, which are transferred to the RAM 81 at appropriate times in the course of startup processing.

Moreover, the ISA bus 85 has a connection established with an Input/Output (I/O) controller 87. The I/O controller 87 comprises a microcontroller, an I/O interface, a CPU, a Read Only Memory (ROM), a RAM and so on, and controls input/output of data between the operating system/application software and various peripherals such as the HDD 74 based on a Basic Input/Output System (BIOS) stored in a flash ROM 88. Also, the I/O controller 87 has connections established with the mouse connector 46, keyboard connector 47, serial connector 49, printer connector 50, FDD 16 and microcontroller board 75.

The microcontroller board 75 comprises a microcontroller 89 and digital selector 90 for switching input/output of digital sound signals, and the digital selector 90 has a connection established with an audio board 79.

On the audio board 79, a Digital/Analog (D/A) conversion division 92 performs D/A conversion of digital sound signals supplied from the digital selector 90 to generate analog sound signals to be supplied to a sound controller 93 and outputted to the outside via the line output connector 43. A sound controller 93 performs, according to control by the microcontroller 89, volume adjustment and equalization to the inputted analog sound signals to be supplied to an amp board 94 and outputted to the outside via the headphone connector 32. The amp board 94 amplifies the analog sound signals and outputs them to the speakers 6 and 7 (FIG. 1) via the speaker connector 44.

On the audio board 79, a digital/optical conversion division 95 converts digital sound signals supplied from the digital selector 90 into optical digital signals to be outputted to the outside via the optical output connector 41. Also, the optical/digital conversion division 91 converts optical digital signals inputted via the optical input connector 42 into digital sound signals to be supplied to the digital selector 90.

Microcontroller board 75 has direct connections established with a power supply division (not illustrated), and the microcontroller 89 is always in operation thereby even in a powered-off state of the main unit 2. The microcontroller 89 also has a connection established with the PC power button 22 and audio power button 23.

If the PC power button 22 is pressed in a powered-off state of the main unit 2, then in response to it, the microcontroller 89 as a control device controls the power supply division and starts to supply power to the divisions comprising the main unit 2 and also outputs a starting instruction to the I/O controller 87. The I/O controller 87 starts processing in response to the starting instruction based on a BIOS program stored in the flash ROM 88, and starts an operating system stored in HDD 74. Thus, the personal computer 1 starts up in PC mode using all the functions of the personal computer 1 under control of the CPU 70;

On the other hand, if the audio power button 22 is pressed in a powered-off state of the main unit 2, then in response to it, microcontroller 89 as a control device controls the power supply and starts supplying power to the divisions comprising the main unit 2 and also controls the mother board 71 to be in a reset state via a power supply controller (not illustrated). Such reset of the mother board 71 puts the video card 72, modem/card bus card 73, HDD 74 and FDD 16 in an inactive state, and thus the personal computer 1 starts up, under control of the microcontroller 89, in audio mode starting only the audio functions of the personal computer 1, namely the DVD-ROM drive 11, MD drive 14, LCD board 76, IR receiver board 77, FM tuner board 78, audio board 79 and an amp board 94. In such audio mode, as it does not start an operating system of the personal computer 1, the starting time of the personal computer 1 is shortened compared with PC mode.

(2) Audio Functions in PC Mode

Next, audio functions of the personal computer 1 in PC mode will be explained.

As mentioned above, if the PC power button 22 is pressed in a powered-off state of the main unit 2, the personal computer 1 starts up in PC mode using all the functions of the personal computer 1 under control of the CPU 70.

In PC mode, the personal computer 1 can arbitrarily select by the digital selector 90 the sound sources of the optical input connector 42, FM tuner board 78, DVD-ROM drive 11, MD drive 14 and sound chip 84 as sound sources of analog output outputted from the line output connector 43, headphone connector 32 and speaker connector 44, and as sound sources of optical digital output outputted from the optical output connector 41.

In addition, in PC mode, the personal computer 1 can mix the sound sources of the optical input connector 42, FM tuner board 78, DVD-ROM drive 11 and MD drive 14 by the sound chip 84 at an arbitrary ratio.

And in PC mode, the personal computer 1 can output signals from the sound sources of the DVD-ROM drive 11, MD drive 14 and FM tuner board 78 by selecting by the digital selector 90 either a route of mixing by the sound chip 84 and outputting them or directly outputting them not via the sound chip 84.

In this PC mode, the CPU 70 controls the LCD board 76, FM tuner board 78, audio board 79, MD drive 14 and digital selector 90 via the microcontroller 89, and also controls DVD-ROM drive 11 via the PCI-ISA bridge 86.

The FM tuner board 78 generates analog sound signals, according to control of the CPU 70, by demodulating an FM broadcast wave supplied from the FM antenna connector 45, and also generates digital sound signals by converting the analog sound signals to digital in a self-contained analog/digital (D/A) conversion division (not illustrated). And the FM tuner board 78 outputs the analog sound signals to the sound chip 84, and also outputs the digital sound signals to the digital selector 90.

The MD drive 14 generates digital sound signals, according to control of the CPU 70, by replaying a placed mini disk, and also generates analog sound signals by performing D/A conversion of the digital sound signals in a self-contained digital/analog (D/A) conversion division (not illustrated). And the MD drive 14 outputs the analog sound signals to the sound chip 84, and also outputs the digital sound signals to the digital selector 90.

The DVD-ROM drive 11 generates digital sound signals, according to control of the CPU 70, by replaying a placed audio CD, and also generates analog sound signals by performing D/A conversion of the digital sound signals in a self-contained D/A conversion division (not illustrated). And the DVD-ROM drive 11 outputs the analog sound signals to the sound chip 84, and also outputs the digital sound signals to the digital selector 90.

The sound chip 84 converts analog sound signals inputted from the FM tuner board 78, DVD-ROM drive 11, MD drive 14, line input connector 53 and microphone connector 54 to digital sound signals in a self-contained A/D conversion division (not illustrated). And the sound chip 84 mixes these digital sound signals with digital sound signals such as sound effects generated by an operating system and supplied from the PCI bus 801 at an ratio according to control of the CPU 70, and outputs the resultant digital sound signals acquired to the digital selector 90.

Figure 6:
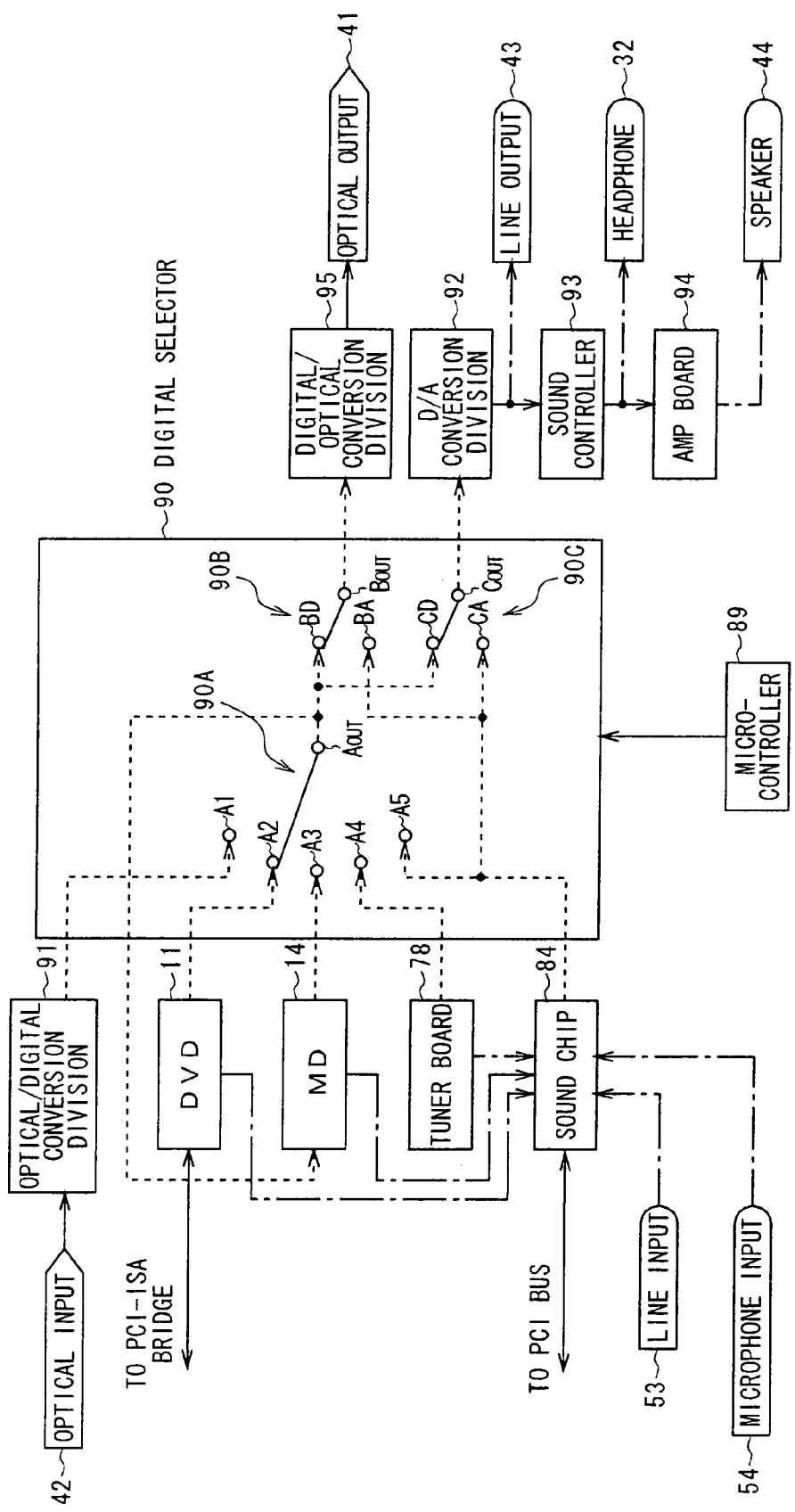
FIG. 6 is a block diagram showing configuration of a digital selector.

As shown in FIG. 6, the digital selector 90 comprises an input selector 90A, optical digital output selector 90B and analog output selector 90C.

In the input selector 90A, an optical/digital conversion division 91 is connected to a first input terminal A1, the DVD-ROM drive 11 is connected to a second input terminal A2, the MD drive 14 is connected to a third input terminal A3, the FM tuner board 78 is connected to a fourth input terminal A4, and the sound chip 84 is connected to a fifth input terminal A5.

Also, the sound chip 84 is connected to an analog input terminal BA of the optical digital output selector 90B and an analog input terminal CA of the analog output selector 90C, and a switching output terminal Aout of the input selector 90A is connected to a digital input terminal BD of the optical digital output selector 90B and a digital input terminal CD of the analog output selector 90C. And a switching output terminal Bout of the optical digital output selector 90B is connected to the digital/optical conversion division 95, and a switching output terminal Cout of the analog output selector 90C is connected to the D/A conversion division 92. In addition, the switching output terminal Aout of the input selector 90A is connected to the MD drive 14, which allows sound signals from a sound source selected by the input selector 90A to be recorded on the MD drive 14.

Here, the personal computer 1 allows switching setting of the digital selector 90 in PC mode to be performed on a sound selection screen 100 (FIG. 7) displayed on the display 3 based on an audio control program.

Figure 7:
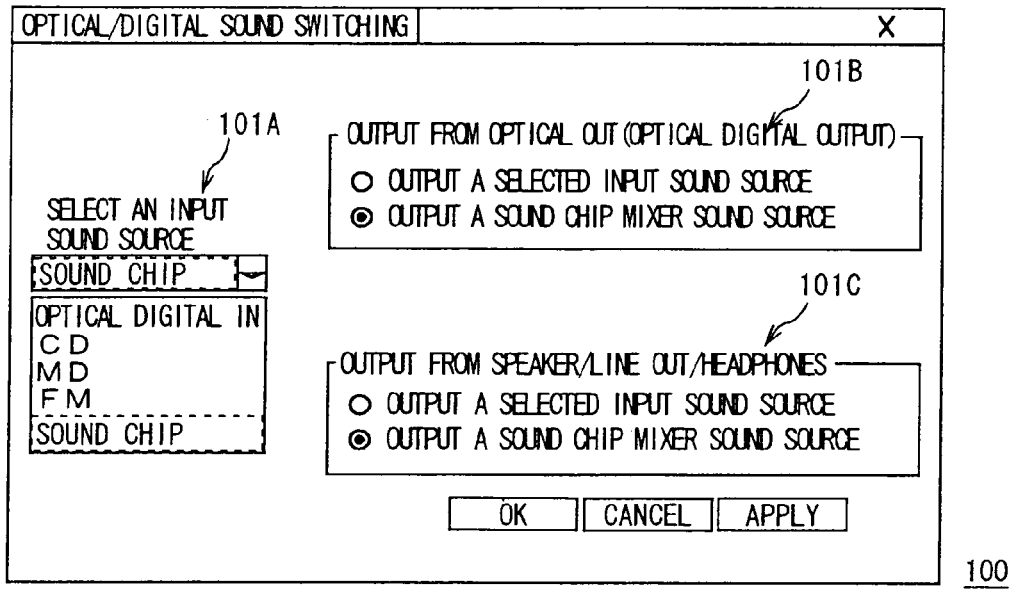
FIG. 7 is a schematic diagram showing configuration of a sound selection screen.

In FIG. 7, the sound selection screen 100 has an input setting division 101A for setting input of the input selector 90A, an optical digital output setting division 101B for setting input of the optical digital output selector 90B, and an analog output setting division 101C for setting input of the analog output selector 90C.

In the input setting division 101A, if "optical digital IN" is selected for instance, the input selector 90A (FIG. 6) accordingly connects switching output terminal Aout to the first input terminal A1, and if "CD" is selected, the input selector 90A accordingly connects the switching output terminal Aout to the second input terminal A2. Likewise, if "MD" is selected in the input setting division 101A, the input selector 90A connects the switching output terminal Aout to the third input terminal A3 and if "FM" is selected, the input selector 90A connects the switching output terminal Aout to the fourth input terminal A4, and if "Sound chip" is selected, the input selector 90A connects the switching output terminal Aout to the fifth input terminal A5.

Moreover, in the optical digital output setting division 101B, if "Output selected input sound source" is selected, the optical digital output selector 90B (FIG. 6) accordingly connects the switching output terminal Bout to the digital input terminal BD, which connects the sound source selected in the input switching setting division 101A to the digital/optical conversion division 95. As opposed to this, in the optical digital output setting division 101B, if "Output sound source of sound chip mixer" is selected, the optical digital output selector 90B accordingly connects the switching output terminal Bout to the analog input terminal BA, which connects the sound chip 84 to the digital/optical conversion division 95.

Likewise, in the analog output setting division 101C, if "Output selected input sound source" is selected, the analog output selector 90C (FIG. 6) accordingly connects the switching output terminal Cout to the digital input terminal CD, which connects the sound source selected in the input switching setting division 101A to the D/A conversion division 92. As opposed to this, in the analog output setting division 101*c*, if "Output sound source of sound chip mixer" is selected, the analog output selector 90C accordingly connects the switching output terminal Cout to the analog input terminal CA, which connects the sound chip 84 to the D/A conversion division 92.

Moreover, the personal computer 1 allows a switching state of the digital selector 90 in PC mode to be checked on the connection state display screen 110 (FIG. 8) displayed on the display 3 based on an audio control program.

Figure 8:
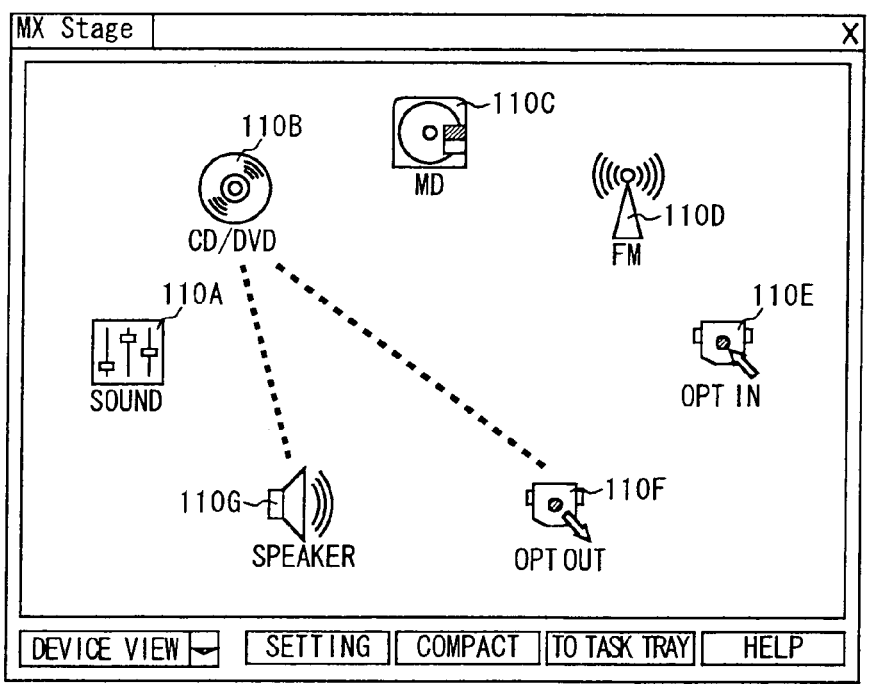
FIG. 8 is a schematic diagram showing configuration of a connection state display screen.

In FIG. 8, the connection state display screen 110 displays seven icons, namely a sound chip icon 110A representing the sound chip 84, a CD/DVD icon 110B representing the DVD-ROM drive 11, an MD icon 110C representing the MD drive 14, an FM icon 110D representing an FM tuner board 78, an optical digital input icon 110E representing optical digital input from the optical digital input connector 42, an optical digital output icon 110F representing optical digital output from the optical digital output connector 41, a speaker icon 110G representing analog output from the line output connector 43, a headphone connector 32 and speaker 6 placed substantially in an ellipse shape.

And the connection state display screen 110 displays an icon indicating a sound source connected by the digital selector 90 and an icon indicating output connected by a dotted line. For instance, as in FIG. 6, in the case where the switching output terminal Aout of the input selector 90A is connected to the second input terminal A2, the switching output terminal Bout of the optical digital output selector 90B is connected to the digital input terminal BD, and the switching output terminal Cout of the analog output selector 90C is connected to the digital input terminal CD, the connection state display screen 110 displays dotted lines between the CD/DVD icon 110B and optical digital output icon 110F and between the CD/DVD icon 110B and speaker icon 110G.

Here, in the case where "Output sound source of sound chip mixer" is selected in the optical digital output setting division 101B (FIG. 7), sound signals from the DVD-ROM drive 11 and MD drive 14 are once converted from digital to analog (D/A conversion) in the DVD-ROM drive 11 or MD drive 14 respectively, and then converted from analog to digital (A/D conversion) in the sound chip 84 to be inputted to the digital/optical conversion division 95.

As opposed to this, in the case where "Output selected input sound source" is selected in the optical digital output setting division 101B, sound signals from the DVD-ROM drive 11 and MD drive 14 are directly inputted as-is as digital sound signals to the digital/optical conversion division 95. Thus, in the case where "Output selected input sound source" is selected in the optical digital output setting division 101B, neither D/A nor A/D conversion of sound signals is performed, and so sound signals of high sound quality can be outputted compared with a case where "Output sound source of sound chip mixer" is selected.

Likewise, in the case where "Output sound source of sound chip mixer" is selected in the analog output setting division 101C, sound signals from the DVD-ROM drive 11 and MD drive 14 are once converted from digital to analog (D/A conversion) in the DVD-ROM drive 11 or MD drive 14 respectively, and then converted from analog to digital (A/D conversion) in the sound chip 84 to be inputted to the D/A conversion division 92.

As opposed to this, in the case where "Output selected input sound source" is selected in the analog output setting division. 101C, sound signals from the DVD-ROM drive 11 and MD drive 14 are directly inputted as-is as digital sound signals to the D/A conversion division 92. Thus, in the case where "Output selected input sound source" is selected in the analog output setting division 101C, neither D/A nor A/D conversion of sound signals is performed, and so sound signals of high sound quality can be outputted compared with a case where "Output sound source of sound chip mixer" is selected.

Thus, the personal computer 1 allows, in addition to a route via the sound chip 84, a route not via the sound chip 84 to be selected as an output route of sound signals from the DVD-ROM drive 11 and MD drive 14.

(3) Audio Functions in Audio Mode

Next, audio functions of the personal computer 1 in audio mode will be explained.

As mentioned above, if the audio power button 23 is pressed in a powered-off state of the main unit 2, the personal computer 1 starts up in audio mode that starts only the audio functions of the personal computer 1 under control of the microcontroller 89.

Such audio mode puts the function division performing an information processing function (executing an operating system and application programs) in the personal computer 1, namely the mother board 71, video card 72, modem/card bus card 73, HDD 74 and FDD 16 in an inactive state.

Also, in audio mode, an operating system of the personal computer 1 is not started, and so the personal computer 1 starts up in a short time in audio mode compared with PC mode.

In audio mode, the personal computer 1 allows one of the optical input connector 42, FM tuner board 78, DVD-ROM drive 11 and MD drive 14 to be selected as a sound source so that sound signals from the selected sound source can be outputted from the line output connector 43, headphone connector 32, speaker connector 44 and optical output connector 41 and also the sound signals from the selected sound source can be recorded on the MD drive 14.

In this audio mode, the microcontroller 89 (FIG. 5) operates in a unique manner to control the LCD board 76, FM tuner board 78, audio board 79, DVD-ROM drive 11, MD drive 14 and digital selector 90.

The FM tuner board 78 demodulates, according to control of the microcontroller 89, an FM broadcast wave supplied from the FM antenna connector 45 and then generates digital sound signals by converting it from analog to digital, and supplies it to the digital selector 90.

The MD drive 14 generates, according to control of the microcontroller 89, digital sound signals by replaying a placed mini disk and supplies them to the digital selector 90.

The DVD-ROM drive 11 operates according to control of the microcontroller 89 and generates digital sound signals by replaying a placed audio CD, and supplies them to the digital selector 90.

Here, the personal computer 1 allows switching setting of the digital selector 90 in audio mode to be performed by using the multifunction buttons 21 associated with display of the LCD panel 20 (FIG. 2). The LCD panel 20 displays a screen according to a sound source selected then (FM tuner board 78, DVD-ROM drive 11, MD drive 14 or optical input connector 42).

Figure 9:
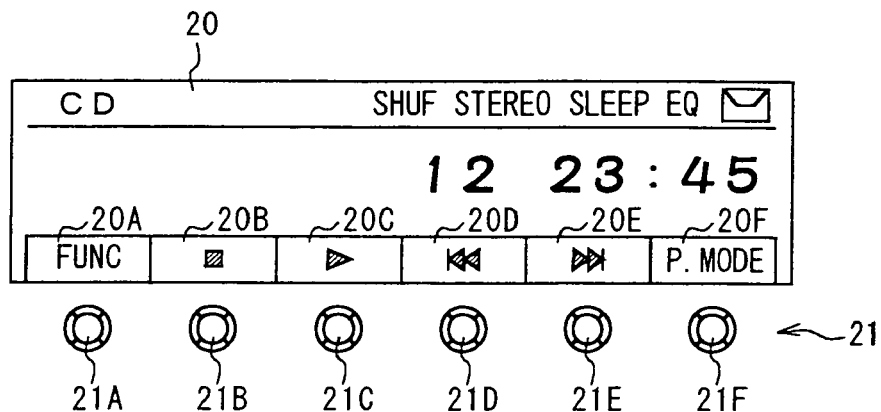
FIG. 9 is a schematic diagram showing a display state of an LCD panel.

For instance, FIG. 9 shows a display state of the LCD panel 20 when the DVD-ROM drive 11 is selected as a sound source, and displays a function icon 20A for showing selection of a sound source, a stop icon 20B for showing a replay stop of an audio CD placed on the DVD-ROM drive 11, a replay icon 20C for showing a replay start of an audio CD, a quick return icon 20D for showing a quick return of a regenerative track of an audio CD, a fast-forward icon 20E for showing a fast-forward of a regenerative track of an audio CD, and a mode icon 20F for showing selection of a replay mode, associated with buttons 21A to 21F of the multifunction buttons 21 respectively. Moreover, when the FM tuner board 78, MD drive 14 or optical input connector 42 is selected as a sound source, the function icon 20A is displayed as associated with the button 21A likewise.

In audio mode, the microcontroller 89 (FIG. 6) controls the digital selector 90, connects the switching output terminal-Bout of the optical digital output selector 90B to the digital input terminal BD, and connects the switching output terminal Cout of the analog output selector 90C to the digital input terminal CD.

Moreover, the microcontroller 89 connects the switching output terminal Aout of the input selector 90A sequentially switching to the first input terminal A1, second input terminal A2, third input terminal A3 and fourth input terminal A4 every time the button 21A is pressed. Thus, the optical input connector 42, FM tuner board 78, DVD-ROM drive 11 and MD drive 14 are sequentially selected as a sound source every time the button 21A is pressed.

Thus, the digital selector 90 selects in audio mode the sound sources of the optical input connector 42, FM tuner board 78, DVD-ROM drive 11 or MD drive 14 according to pressing of the button 21A, and outputs digital sound signals supplied from the selected sound sources to the outside via the digital/optical conversion division 95 and D/A conversion division 92.

Here, in audio mode, the personal computer 1 supplies digital sound signals from the respective sound sources of the optical input connector 42, DVD-ROM drive 11, MD drive 14, and FM tuner board 78 directly to the digital/optical conversion division 95 and D/A conversion division 92, not via the sound chip 84. Thus, in audio mode, digital sound signals from the sound sources go through neither D/A nor A/D conversion partway, and so the personal computer 1 can output sound signals of high sound quality in audio mode.

(4) Timer Reservation Function of Personal Computer 1

In addition to such configuration, the personal computer 1 as a reservation registration apparatus has a timer reservation function for starting and ending various processes such as replaying a music CD by the DVD-ROM drive 11, replaying an MD by the MD drive 14, receiving an FM broadcast by the FM tuner board 78 or executing an arbitrary program (hereinafter, referred to as reservation subjects) at a predetermined date and time. I this connection, the personal computer 1 allows timer reservations with different starting and ending dates and times and reservation subjects to be set up to eight types maximum respectively.

The personal computer 1 allows various reservation setting information such as reservation subjects and starting date and time in this timer reservation function to be set on a timer reservation screen 120 (FIG. 10) displayed on the display 3 according to a timer reservation program stored on the HDD 74.

(4-1) Configuration of Timer Reservation Screen 120

Figure 10:
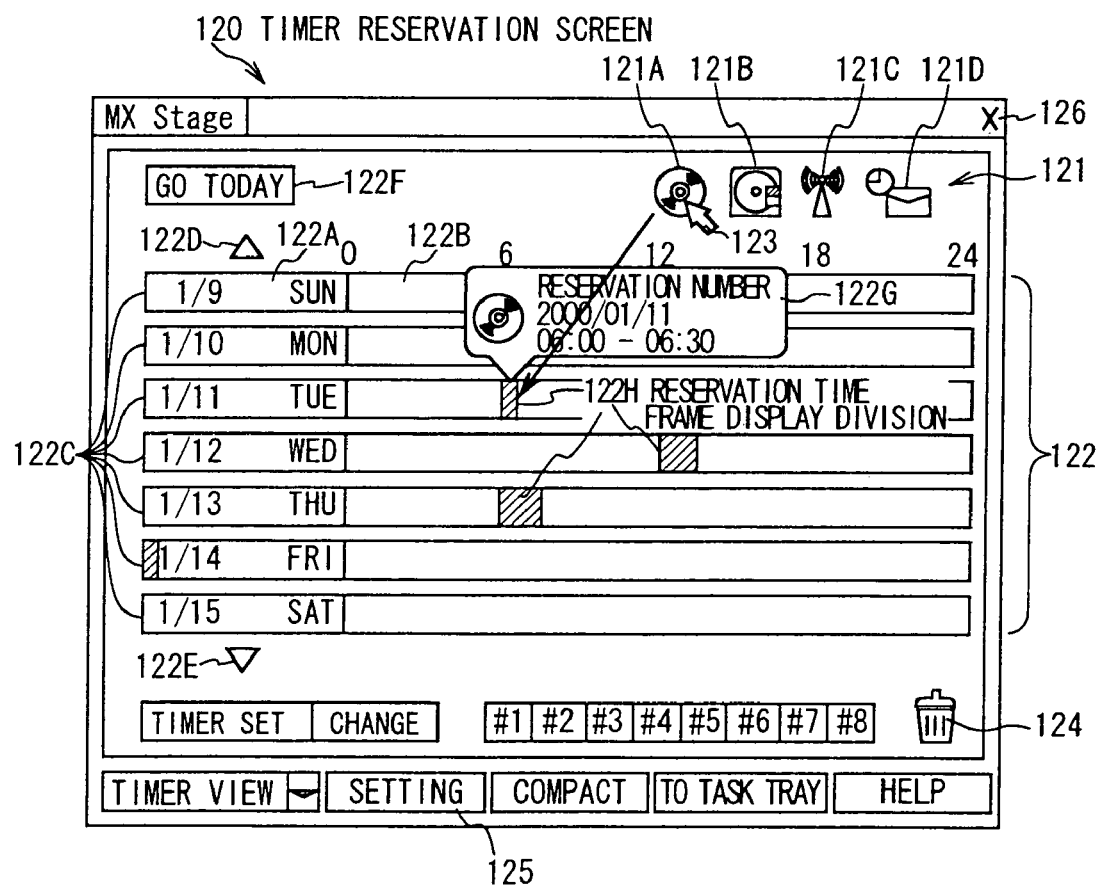
FIG. 10 is a schematic diagram showing configuration of a timer reservation screen.

As shown in FIG. 10, a reservation subject icon display area 121 is provided at the upper right end of the timer reservation screen 120, where four reservation subject icons, namely a CD icon 121A representing a replay of a CD, an MD icon 121B representing a replay of an MD, an FM icon 121C representing receiving of an FM broadcast and a personal timer icon 121D are displayed.

Figure 14:
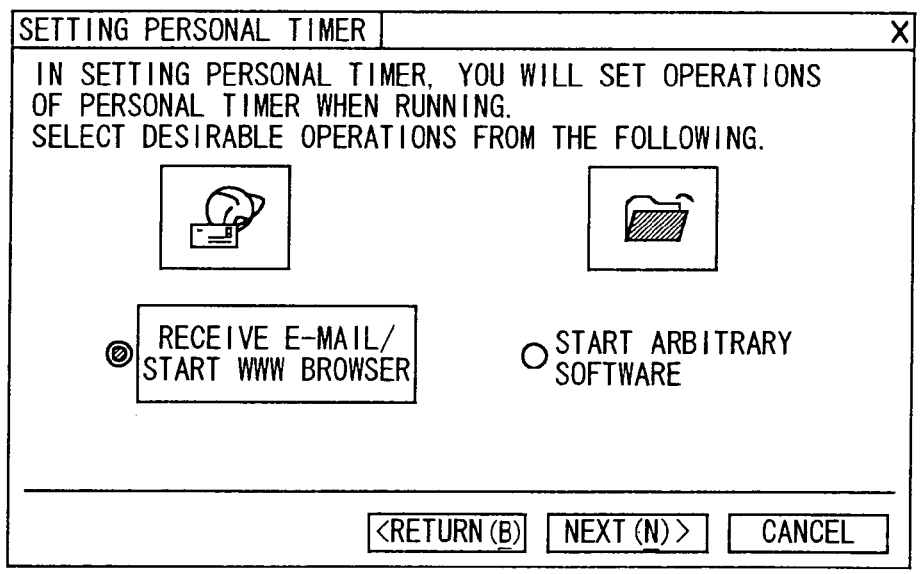
FIG. 14 is a schematic diagram showing configuration of a personal timer setting screen.

Here, the personal timer icon 121D is an icon representing a virtual apparatus executing an arbitrary program set on a personal timer setting screen 150 (FIG. 14) mentioned later. This timer reservation screen 120 has a personal timer icon 121D in addition to the CD icon 121A, MD icon 121B and FM icon 121C so that timer reservations can be made for an audio function and a process of a program on the same timer reservation screen 120 by the same operation.

Moreover, a calendar display area 122 is provided in the center of the timer reservation screen 120. The calendar display area 122 displays vertically on the screen a daily display area 122C for one week from Sunday to Saturday comprising a date display area 122A displaying month, date, and day of the week and a time base display area 122B displaying 24 hours of a day taking a time base horizontally on the screen.

In addition, at the upper left and the lower left of the calendar display area 122, a calendar turning back button 122D for turning back on a week-to-week basis a daily display area 122C displayed in the calendar display area 122 and a calendar forwarding button 122E for forwarding a daily display area 122C on a week-to-week basis are provided respectively. Furthermore, above the calendar turning back button 122D, a "GO TODAY" button 122F for displaying the daily display area 122C for one week including the daily display area 122C dated today in the calendar display area 122 is provided.

The timer reservation screen 120 allows a user to make a timer reservation by using a mouse pointer 123 operated via the mouse 5 (FIG. 1) to drag and drop a desired reservation subject icon on a desired time location in the time base display area 122B of a desired date. Incidentally, to drag and drop refers to an operation of moving the mouse pointer 123 onto a desired icon first and pressing a left button of the mouse 5, and moving the mouse pointer 123 while pressing the left button to move the icon together with the mouse pointer 123 (it is referred to as drag), and then release the left button of the mouse 5 on a desired location to complete the movement of the icon (it is referred to as drop).

For instance, as shown in FIG. 10, if the CD icon 121A is dragged to the time base display area 122B in the daily display area 122C of "1/11," the CPU 70 as a display control device accordingly performs pop-up display of a reservation information display division 122G above the location to which the CD icon 121A is dragged.

The reservation information display division 122G displays a reservation subject icon (CD icon 121A in this case), a reservation number to identify a plurality of timer reservations (#1), starting date (2000 Jan. 11), starting time (06:00) and ending time (06:30). At this time, the CPU 70 displays the reservation information display 122G, taking as starting time a time corresponding to a location to which the CD icon 121A is dragged and also taking as provisional ending time on initialization a time that is thirty minutes after the starting time.

And if a reservation subject icon is dropped on the time base display area 122B, the CPU 70 as a display control device accordingly displays a reservation time frame display division 122H in the time base display area 122B.

The left end and right end positions of the reservation time frame display division 122H correspond to a starting time and an ending time in timer reservation respectively, and the timer reservation screen 120 thereby allows a user to visually recognize a starting time and an ending time of a timer reservation by a position and a width of the reservation time frame display division 122H.

Here, the timer reservation screen 120 allows the reservation time frame display division 122H to be moved to an arbitrary position in the time base display area 122B or to the time base display area 122B of another date by dragging and dropping the center of the reservation time frame display division 122H so that starting date and time in timer reservation can be easily changed thereby.

Moreover, the timer reservation screen 120 allows, by dragging and dropping the left or right end of the reservation time frame display division 122H, a width of the reservation time frame display division 122H to be changed so that a starting time or an ending time in a timer reservation can be easily changed. At this time, the CPU 70 performs pop-up display of the reservation information display division 122G according to a drag and drop operation of the reservation time frame display division 122H so that a user can recognize a starting time and an ending time after the change.

And if an end button 126 is clicked on by the user, the CPU 70 as a display control device stores reservation setting information set on the timer reservation screen 120 in a memory (not illustrated) in the microcontroller 89 (FIG. 5) and then finishes display of the timer reservation screen 120.

Thus, the personal computer 1 allows a timer reservation setting process, changes of the settings and a check of the timer reservation settings to be easily performed on the timer reservation screen 120.

Figure 11:
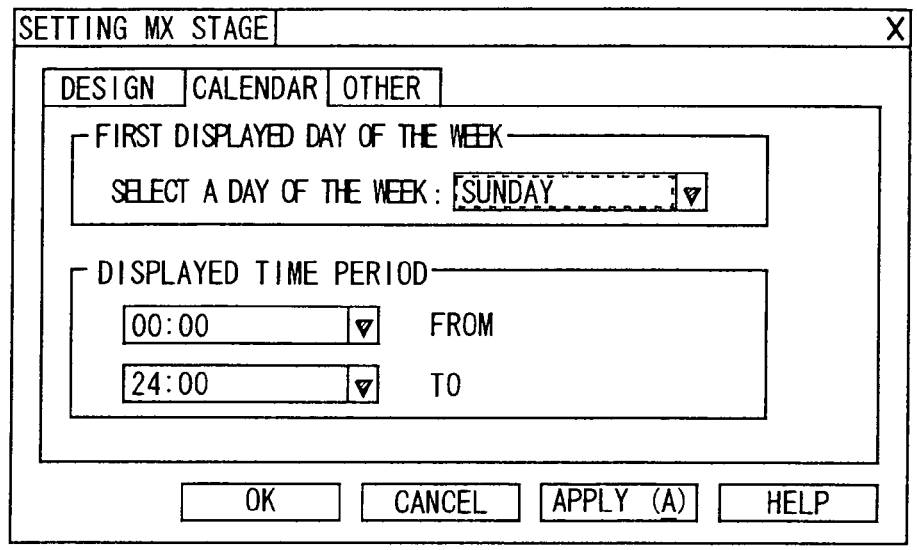
FIG. 11 is a schematic diagram showing configuration of a display setting screen.

Incidentally, the timer reservation screen 120 allows, by dragging and dropping the reservation time frame display division 122H to a trash icon 124, a timer reservation shown by the reservation time frame display division 122H to be canceled, and also by clicking on a display setting button 125, a display setting screen 140 for setting details of a display state of the calendar display area 122 to be displayed as shown in FIG. 11.

Figure 12:
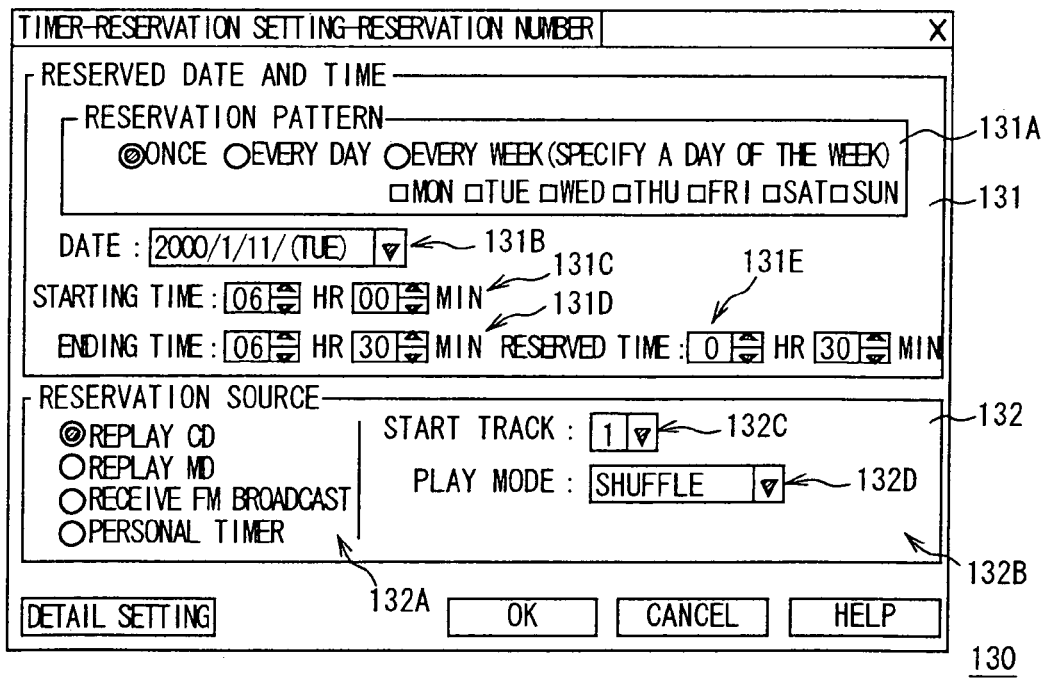
FIG. 12 is a schematic diagram showing configuration of a reservation setting screen.
Figure 13:
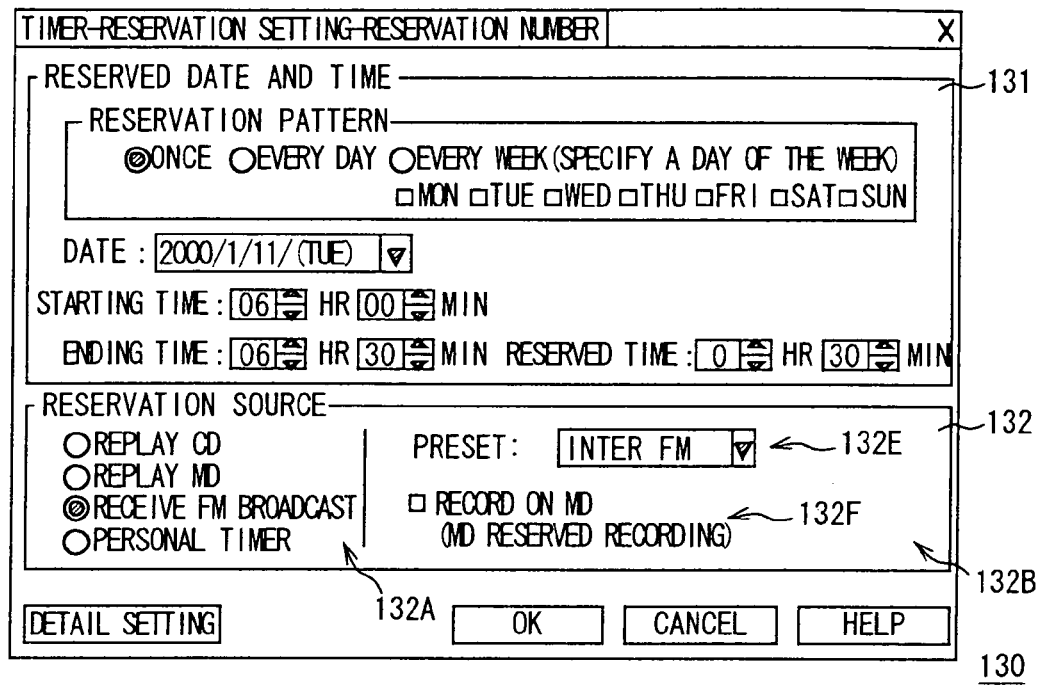
FIG. 13 is a schematic diagram showing configuration of a reservation setting screen.

Furthermore, the timer reservation screen 120 allows, by double-clicking on the reservation time frame display division 122H, a reservation setting screen 130 for setting details of a timer reservation shown by the reservation time frame display division 122H to be displayed as shown in FIGS. 12 and 13.

As shown in FIG. 12, the reservation setting screen 130 has a reservation date and time setting area 131 for setting details of reserved date and time and a reservation subject setting area 132 for setting details of a reservation subject.

The reservation date and time setting area 131 has a reservation pattern setting area 131A for setting a performance pattern of a timer reservation (whether implementing a set timer reservation only on an arbitrary day, every day or every specified day of the week), a starting date setting area 131B for setting a starting date, a starting time setting area 131C for setting a starting time, an ending time setting area 131D for setting an ending time, and a performance time setting area 131E for setting a performance time (that is, difference between a starting time and an ending time) of a timer reservation.

If a set value of a performance time is changed by using the performance time setting area 131E, a set value of an ending time also changes in conjunction with the change. Also, in the case where a reservation subject is personal timer, only the reservation pattern setting area 131A, starting date setting area 131B and starting time setting area 131C can be operated, and the ending time setting area 131D and performance time setting area 131E cannot be operated.

Here, in a state immediately after displaying the reservation setting screen 130, the set values of the starting date setting area 131B, starting time setting area 131C, ending time setting area 131D and performance time setting area 131E reflect a display position and a width of the reservation time frame display division 122H on the timer reservation screen 120 (FIG. 10).

More concretely, a set value of the starting date setting area 131B corresponds to a date of the daily display area 122C displaying the reservation time frame display division 122H on the timer reservation screen 120, and a set value of the starting time setting area 131C corresponds to a left end position of the reservation time frame display division 122H, and a set value of the ending time setting area 131D corresponds to a right end position of the reservation time frame display division 122H, and a set value of the performance time setting area 131E corresponds to a width of the reservation time frame display division 122H.

And if each of the set values of the starting date setting area 131B, starting time setting area 131C, ending time setting area 131D and performance time setting area 131E is changed, a display position or a display width of the reservation time frame display division 122H on the timer reservation screen 120 is correspondingly changed.

The reservation subject setting area 132 has a reservation subject selection area 132A for selecting a reservation subject and a reservation subject details setting area 132B for setting details of the selected reservation subject. The reservation subject details setting area 132B changes its display contents according to the reservation subject set in the reservation subject selection area 132A.

For instance, if "Replay CD" or "Replay MD" is selected in the reservation subject selection area 132A, as shown in FIG. 12, reservation subject details setting area 132B displays a start track setting area 132C for setting a replay start track when replaying a CD or an MD, and a play mode setting area 132D for setting a play mode (shuffle play, one tune repeated play, etc,) when replaying a CD or an MD.

As opposed to this, in the case where "Receive FM broadcast" is selected in the reservation subject selection area 132A, as shown in FIG. 13, the reservation subject details setting area 132B displays a station selection area 132E for selecting a subject receiving station, and an MD recording setting area 132F for selecting whether or not to record a received FM broadcast on an MD (so-called air check).

Moreover, in the case where "Personal timer" is selected in the reservation subject selection area 132A, the reservation subject details setting area 132B displays only the sentences "Personal timer is only changeable as to starting date and time. Ending date and time are not changeable." In this connection, setting of personal timer is performed by using a personal timer setting screen 150 shown in FIG. 14. The personal timer setting screen 150 allows automatic reception of electronic mail and going round arbitrary Web pages or starting arbitrary software to be selected as a reservation subject to be implemented by a timer reservation.

Thus, the personal computer 1 displays the timer reservation screen 120 on the display 30 based on a timer reservation program, and stores reservation setting information set on the timer reservation screen 120 in a memory (not illustrated) contained in the microcontroller 89.

As mentioned above, the microcontroller 89 is always in operation even when the main unit 2 of the personal computer 1 is powered off. The Microcontroller 89 operates based on reservation setting information stored in the self-contained memory, and if starting date and time set in the reservation setting information come, starts up the powered-off main unit 2 in a mode conforming to a set reservation subject (PC mode or audio mode) to implement the reservation subject.

For instance, in the case where a reservation subject set in the reservation setting information is personal timer, the microcontroller 89 starts up the main unit 2 in PC mode and further controls the CPU 70 to execute a program set by the personal timer. And if execution of the program is completed, the microcontroller 89 powers off the main unit 2.

As opposed to this, in the case where a reservation subject set in the reservation setting information is other than personal timer, the microcontroller 89 starts up: the main unit 2 in audio mode to implement the reservation subject. And if ending date and time set in the reservation setting information come, the microcontroller 89 powers off the main unit 2 after finishing implementation of the reservation subject.

(4-2) Timer Reservation Process by CPU 70

Next, a timer reservation process by the CPU 70 will be explained by using a flowchart shown in FIG. 15.

Figure 15:
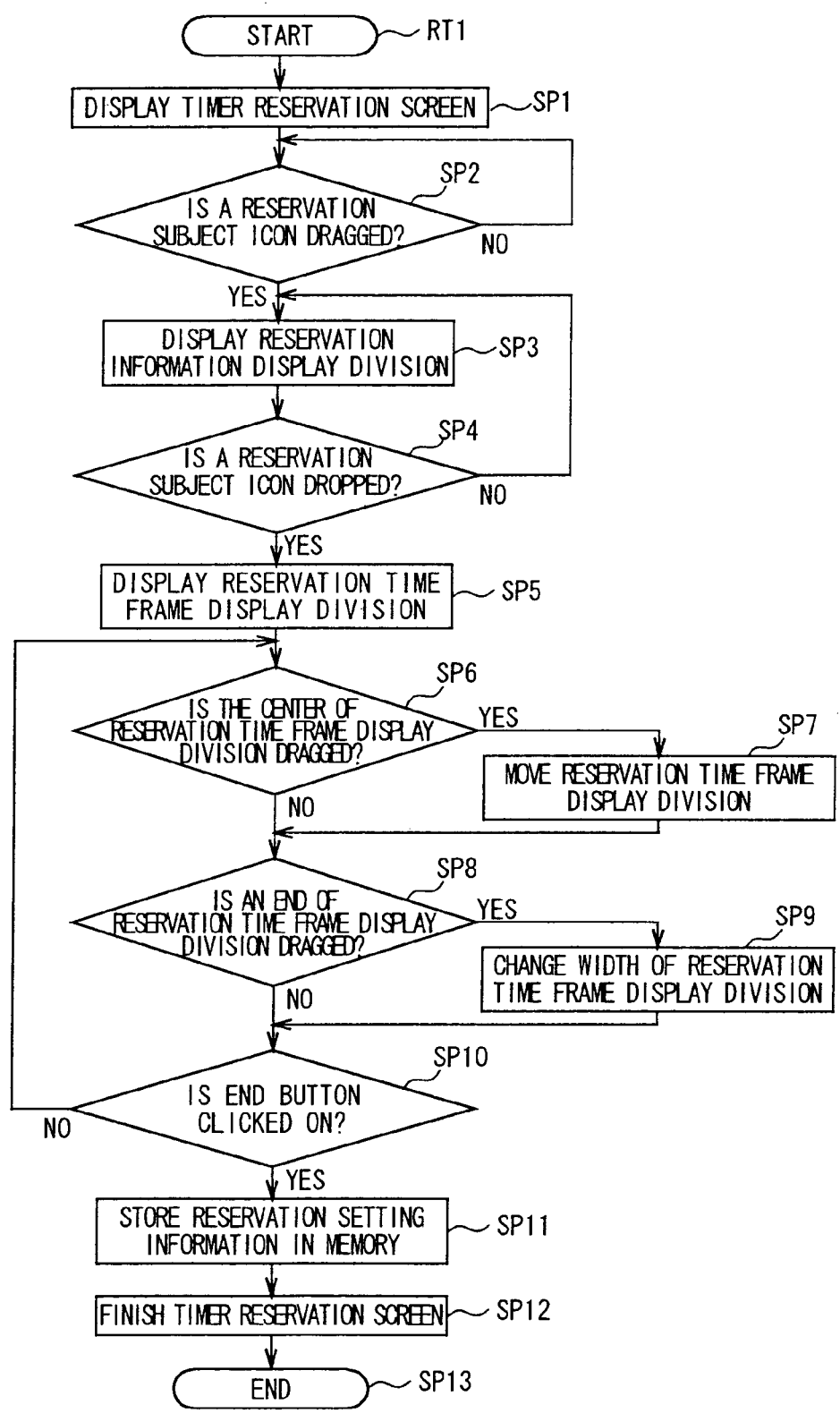
FIG. 15 is a flowchart showing of a timer reservation procedure.

More specifically, as shown in FIG. 15, the CPU 70 enters from routine RT1 and then moves on to step SP1 in compliance with the timer reservation program.

In step SP1, the CPU 70 displays the timer reservation screen 120 on the display 3 and then moves on to the next step SP2.

In step SP2, the CPU 70 determines whether or not a reservation subject icon is dragged onto the time base display area 122B by a user.

If a negative result is acquired in step SP2, it indicates that a reservation subject icon is not dragged onto the time base display area 122B, and the CPU 70 returns to step SP2.

As opposed to this, in the case where an affirmative result is acquired in step SP2, it indicates that a reservation subject icon is dragged onto the time base display area 122B by a user, and the CPU 70 proceeds to the next step SP3.

In step SP3, the CPU 70 displays the reservation subject icon in movement according to a drag by a user, and also performs pop-up display of the reservation information display division 122G according to a position of the reservation subject icon, and then proceeds to the next step SP4.

In step SP4, the CPU 70 determines whether or not a reservation subject icon is dropped on the time base display area 122B by a user.

If a negative result is acquired in step SP4, it indicates that a reservation subject icon is not dropped on the time base display area 122B, and the CPU 70 returns to step SP3.

As opposed to this, in the case where an affirmative result is acquired in step SP4, it indicates that a reservation subject icon is dropped on the time base display area 122B by a user, and the CPU 70 proceeds to the next step SP5.

In step SP5, the CPU 70 displays the reservation time frame display division 122H according to a position of a reservation subject icon dropped on the time base display area 122B, and then moves on to the next step SP6. At this time, the CPU 70 takes as starting time a location on which the reservation subject icon is dropped and also takes as provisional ending time a time that is thirty minutes after the starting time so as to display the reservation time frame display division 122H based on these starting time and ending time.

In step SP6, the CPU 70 determines whether or not the center of the reservation time frame display division 122H is dragged by a user.

If a negative result is acquired in step SP6, it indicates that the center of the reservation time frame display division 122H is not dragged, and the CPU 70 moves on to the next step SP8.

As opposed to this, in the case where an affirmative result is acquired in step SP6, it indicates that the center of the reservation time frame display division 122H is dragged, and the CPU 70 moves on to step SP7, and displays the entire reservation time frame display division 122H in movement according to the drag, and then moves on to step SP8.

In step SP8, the CPU 70 determines whether or not a right end or a left end of the reservation time frame display division 122H is dragged by a user.

If a negative result is acquired in step SP8, it indicates that neither right nor left end of the reservation time frame display division 122H is dragged, and the CPU 70 moves on to the next step SP10.

As opposed to this, in the case where an affirmative result is acquired in step SP8, it indicates that either right end or left end of the reservation time frame display division 122H is dragged, and the CPU 70 moves on to step SP9, and displays the reservation time frame display division 122H changing its width according to the drag, and then moves on to step SP10.

In step SP10, the CPU 70 determines whether or not the end button 126 is clicked on by a user.

If a negative result is acquired in step SP10, it indicates that the end button 126 is not clicked on, and the CPU 70 returns on to the next step SP6.

As opposed to this, in the case where an affirmative result is acquired in step SP10, it indicates that the end button 126 is clicked on, and the CPU 70 moves on to step SP11, and stores reservation setting information based on the reservation time frame display division 122H in a memory in the microcontroller 89, and finishes display of the timer reservation screen 120 in the next step SP12, and then finishes the process in step SP13.

(5) Operation and Effect of Embodiments

In the above configuration, if a reservation subject icon selected by a user is dragged and dropped on the time base display area 122B desired by the user, the personal computer 1 accordingly displays the reservation time frame display division 122H so as to have performance starting and ending dates and times of the reservation subject visually recognized by a user.

Also, if the center of the reservation time frame display division 122H is dragged and dropped on an arbitrary position in the time base display area 122B by a user, the personal computer 1 accordingly moves the entire reservation time frame display division 122H, and if either right end or left end of the reservation time frame display division 122H is dragged and dropped by a user, it accordingly changes the width of the reservation time frame display division 122H so as to have a change of starting or ending date and time of a reservation subject thereby visually recognized by a user.

Furthermore, if the reservation time frame display division 122H is dragged and dropped on the trash icon 124 by a user, the personal computer 1 accordingly erases the reservation time frame display division 122H so as to have cancellation of a timer reservation visually recognized by a user.

According to the above configuration, the personal computer 1 can set a timer reservation just by a click by a user even in the case where there are a plurality of reservation subjects, only if a desired reservation subject icon is selected among a plurality of reservation subject icons and the selected icon is dragged and dropped on a desired time base display area 122B.

This allows a user to make a timer reservation intuitively and easily just by a click while watching the timer reservation screen 120.

Moreover, the personal computer 1 can easily change settings of starting and ending dates and times of a reservation subject just by a drag and drop to the center of the reservation time frame display division 122H or the right end or left end of the reservation time frame display division 122H, and it can also have a timer reservation setting and its change and a check of the setting recognized by a user at a glance on the timer reservation screen 120.

(6) Other Embodiments

Moreover, while the above embodiments described a case where the present invention is applied to the desktop type personal computer 1 wherein the display 3 and main unit 2 are separate, the present invention can, not limited thereto, be applied to a desktop type personal computer wherein a display is integral with a main unit or a notebook-sized personal computer.

Furthermore, while a timer reservation is made for a program set on 2 the DVD-ROM drive 11, MD drive 14 and FM tuner board 78 contained in the main unit 2 and personal timer in the above-mentioned embodiment, the present invention can, not limited thereto, be applied so that various devices externally connected to the main unit 2 are set as reservation subjects for which a timer reservation can be made.

In addition, while a timer reservation is made for a program set on 2 the DVD-ROM drive 11, MD drive 14 and FM tuner board 78 contained in the main unit 2 and personal timer in the above-mentioned embodiment, the present invention can, not limited thereto, be applied so that an operating system of the main unit 2 is reserved and registered by personal timer.

Moreover, while reservation registration on the personal computer 1 is described in the above-mentioned embodiment, the present invention can, not limited thereto, be applied to reservation registration on various apparatuses such as reservation registration of VTR recording, reservation registration of receiving on a satellite broadcasting receiver or reservation registration of cooking on a cooking apparatus such as an electronic oven and so on.

Furthermore, while the CPU 70 performs a timer reservation process by displaying the timer reservation screen 120 on the display 3 based on a timer reservation program stored in the HDD 74 in the above-mentioned embodiment, the present invention can, not limited thereto, be applied so that the above-mentioned timer reservation process is performed by installing a program storage medium recording a timer reservation program.

Thus, a program storage medium used for installing a timer reservation program for performing the above-mentioned series of timer reservation processing on the personal computer 1 so that it can be executed by the personal computer 1 is not limited to package media such as a floppy disk, Compact Disk-Read Only Memory (CD-ROM) or DVD for instance, it can also be implemented by semiconductor memory, magnetic disk or the like temporarily or permanently storing a program. Moreover, as a device for storing a program on these program storage media, wire and radio communication media such as a local area network, the Internet, digital satellite broadcasting and so on can be utilized, or it can also be stored by way of various communication interfaces such as a router and a modem.

As mentioned above, the present invention allows reservation registration of a reservation subject to be easily performed by intuitive operation, that is, just by moving a desired reservation subject icon to a time base display area.

Also, it allows settings of starting and ending dates and times of a reservation subject to be easily changed just by moving the center of a reservation time frame display division or a right end or a left end of the reservation time frame display division.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A reservation registration apparatus for performing a reservation registration process of causing an arbitrary reservation subject to be manipulated at a specified starting time, said apparatus comprising:

display controller configured to display on a display screen a plurality of reservation subject icons representing said reservation subjects and a time base display area of a calendar for performing said reservation registration, and when said reservation subject icon is moved onto said time base display area, displaying a reservation information display division in a pop-up display at a position on said time base display area onto which said reservation subject icon is moved, the reservation information display division displaying information corresponding to a location on said time base display area to which said reservation subject icon is moved;

controlling mechanism configured to perform said reservation registration taking a time according to the information displayed on said reservation information display division on said time base display area as a starting time of the process of said reservation subject;

selection mechanism configured to receive input media for said arbitrary reservation subject, said input media generated by at least one component, said selection mechanism including, an input selector configured to select said at least one component as an input, a mixing device configured to mix analog, digital, and optical formats of said input media when more than one component is selected, and an output selector configured to connect the at least one selected component with a selected output, the outputs including an analog output and a digital output;

conversion mechanism configured to appropriately convert said formats of said input media generated by said at least one component so that said input media for said arbitrary reservation subject can be properly performed, and a process control mechanism always in operation to control a power supply to turn on when the starting time set in the reservation setting information is reached, and configured to control the performance of said reservation subject according to said starting time of said reservation time.

2. The reservation registration apparatus according to claim 1 wherein said reservation subject is a program executed by a predetermined information processing apparatus.

3. The reservation registration apparatus according to claim 1 wherein said display controller displays a reservation time frame display division of which a first end is a position corresponding to said starting time on said time base display area and a second end is a position corresponding to an arbitrary ending time after said starting time on said time base display area, and said controlling mechanism performs said reservation registration of said starting time and said ending time based on the positions of said first end and the second end on said time base display area.

4. The reservation registration apparatus according to claim 3 wherein when said entire reservation time frame display division is moved on said time base display area, said controlling mechanism changes said starting time and said ending time registered for reservation according to a position of said reservation time frame display division after the movement.

5. The reservation registration apparatus according to claim 3 wherein when said first end or said second end of the reservation time frame display division is moved on said time base display area, said controlling mechanism changes said starting time or said ending time registered for reservation according to a position of said first end or said second end after the movement.

6. The reservation registration apparatus according to claim 3 wherein when said entire reservation time frame display division is moved onto a trash icon displayed on said display screen, said controlling mechanism erases the entire reservation time frame display division and also deletes said reservation registration.

7. The reservation registration apparatus of claim 1, wherein said at least one component includes audio.

8. The reservation registration apparatus of claim 1, wherein said at least one component includes video.

9. The reservation registration apparatus of claim 1, wherein said formats of said at least one component includes an analog format.

10. The reservation registration apparatus of claim 1, wherein said formats of said at least one component includes a digital format.

11. The reservation registration apparatus of claim 1, wherein said formats of said at least one component includes an optical format.

12. The reservation registration apparatus of claim 1, wherein said reservation subject plays disc drive.

13. The reservation registration apparatus of claim 1, wherein said reservation subject receives signal from radio.

14. A method of reservation registration for performing a reservation registration process of causing an arbitrary reservation subject to be manipulated at a specified starting time, said method comprising:
   displaying on a display screen a plurality of reservation subject icons representing said reservation subjects and a time base display area of a calendar for performing said reservation registration;
   displaying a reservation information display division in a pop-up display at a position on said time base display area onto which said reservation subject icon is moved when said reservation subject icon is moved onto said time base display area, the reservation information display division displaying information corresponding to a location on said time base display area to which said reservation subject icon is moved;
   performing said reservation registration taking a time according to the information displayed in said reservation information display division on said time base display area as a starting time of the process of said reservation subject;
   receiving input media for said arbitrary reservation subject, where said input media is generated by at least one component;
   selecting generated said at least one component as an input;
   mixing analog, digital, and optical formats of said input media when more than one component is selected for input;
   connecting the selected input with a selected output, the outputs including an analog output and a digital output;
   converting said formats of said input media generated by said at least one component so that said input media for said arbitrary reservation subject can be properly performed; and
   maintaining operation of a control mechanism to control a power supply to turn on when the starting time set in the reservation setting information is reached, and controlling the performance of said reservation subject according to said starting time of said reservation time.

15. The method of reservation registration according to claim 14 wherein said reservation subject is a program executed by a predetermined information processing apparatus.

16. The method of reservation registration according to claim 14 further comprising:
   displaying a reservation time frame display division of which a first end is a position corresponding to said starting time on said time base display area and a second end is a position corresponding to an arbitrary ending time after said starting time on said time base display area; and said performing said reservation registration performs said reservation registration of said starting time and said ending time based on the positions of said first end and the second end on said reservation time frame display division.

17. The method of reservation registration according to claim 16 further comprising:
   changing said starting time and said ending time registered for reservation according to a position of said reservation time frame display division after a movement when said entire time frame display is moved on said time base display area.

18. The method of reservation registration according to claim 16 further comprising:
   changing said starting time or said ending time registered for reservation according to a position of said first end or said second end after a movement when said first end or said second end of the reservation time frame display division is moved on said time base display area.

19. The method of reservation registration according to claim 16 further comprising:
   erasing the reservation time frame display division and also deleting said reservation registration when said entire reservation time frame display division is moved onto a trash icon displayed on said display screen.

20. A computer readable medium storing computer program instructions which when executed by a computer programmed with the instructions causes the computer to perform the following steps:
   display on a display screen a time base display area for performing a reservation registration process of causing an arbitrary reservation subject to be manipulated and a reservation subject icon representing said reservation subject;
   display a reservation information display division in a pop-up display at a position on the time base display area onto which the reservation subject icon is moved when said reservation subject icon is moved onto said time base display area of a calendar, the reservation information display division displaying information corresponding to a location on said time base display area to which said reservation subject icon is moved;
   perform said reservation registration taking a time according to the information displayed in said reservation information display division on said time base display area as a starting time of the process of said reservation subject;
   receive input media for said arbitrary reservation subject, where said input media is generated by at least one component;
   select said at least one component of said media as an input;
   mix analog, digital, and optical formats of said input media when more than one component is selected for input;
   connect the selected input with a selected output, the outputs including an analog, output and a digital output;
   convert said formats of said input media generated by said at least one component so that said input media for said arbitrary reservation subject can be properly performed; and
   maintaining operation of a control mechanism to control a power supply to turn on when the starting time set in the reservation setting information is reached, and controlling the performance of said reservation subject according to said starting time of said reservation time.

21. The computer readable medium according to claim 20, wherein said reservation subject is a program executed by a predetermined information processing apparatus.

22. The computer readable medium according to claim 20 further comprising:
   displaying a reservation time frame display division of which a first end is a position corresponding to said starting time on said time base display area and a second end is a position corresponding to an arbitrary ending time after said starting time on said time base display area; and said performing said reservation registration performs said reservation registration of said starting time and said ending time based on the positions of said first end and the second end on said reservation time frame display division.

23. The computer readable medium according to claim 22, further comprising:
   changing said starting time and said ending time registered for reservation according to a position of said reservation time frame display division after a movement when said entire reservation time frame display is moved on said time base display area.

24. The computer readable medium according to claim 22, further comprising:

changing said starting time or said ending time registered for reservation according to a position of said first end or said second end after a movement when said first end or said second end of the reservation time frame display division is moved on said time base display area.

25. The computer readable medium according to claim 22, further comprising:

erasing the entire reservation time frame display division and also deleting said reservation registration when said entire reservation time frame display division is moved onto a trash icon displayed on said display screen.

* * * * *